United States Patent [19]
Johnson

[11] Patent Number: 5,746,994
[45] Date of Patent: May 5, 1998

[54] METHOD FOR SYNTHESIZING FERRATE AND FERRATE PRODUCED THEREBY

[75] Inventor: Michael D. Johnson, Las Cruces, N. Mex.

[73] Assignee: New Mexico State University Technology Transfer Corporation, Las Cruces, N. Mex.

[21] Appl. No.: 694,948

[22] Filed: Aug. 9, 1996

[51] Int. Cl.$^6$ .............................. C01D 1/02; C01G 49/02
[52] U.S. Cl. ...................... 423/594; 423/140; 423/141; 423/142
[58] Field of Search .................... 423/140, 141, 423/142, 594

[56] References Cited

U.S. PATENT DOCUMENTS

| | | | |
|---|---|---|---|
| 2,758,090 | 8/1956 | Mills et al. | 252/186 |
| 2,835,553 | 5/1958 | Harrison et al. | 23/50 |
| 4,304,760 | 12/1981 | Mein et al. | 423/150 |
| 4,385,045 | 5/1983 | Thompson | 423/594 |
| 4,405,573 | 9/1983 | Deininger et al. | 423/150 |
| 4,500,499 | 2/1985 | Kaczur et al. | 423/139 |
| 4,551,326 | 11/1985 | Thompson | 423/594 |
| 4,983,306 | 1/1991 | Deininger et al. | 210/724 |
| 5,202,108 | 4/1993 | Deininger | 423/594 |
| 5,284,642 | 2/1994 | Evrard et al. | 423/594 |

FOREIGN PATENT DOCUMENTS

| | | | |
|---|---|---|---|
| 90/00775 | 5/1991 | WIPO | C01G 49/02 |

OTHER PUBLICATIONS

Audette, T.J., J. Quail and P. Smith, "Ferrate (VI) Ion, A Novel Oxidizing Agent," J. Tetr. Lett., vol. 2,. pp. 279–282 (1971).

Bartzatt, R.L., and J. Carr, "The Kinetics of Oxidation of Low Molecular Weight Aldehydes by Potassium Ferrate," Trans. Met. Chem., vol. 11 (11), pp. 414–416 (1986).

Bartzatt, R.L. and D. Nagel, "Removal of Nitrosamines from Waste Water by Potassium Ferrate Oxidation," Arch. Env. Health, vol. 46(5), pp. 313–315 (1991).

Darling, D., V. Kumari and J. BeMiller, "Oxidation of Carbohydrates with the Ferrate (VI) Ion," J. Tetr. Lett., vol. 40., pp. 4143–4146 (1972).

Fremy, E.F., "Recherches son Les Acides Metalliques,"Ann. Chim. Phys., pp. 361–382 (1844) (No Translation).

Gump, J., W. Wagner and E. Hart, "Factors Affecting the Stability of Aqueous Potassium Ferate (VI) Solutions," Anal. Chem., vol. 24., pp. 1497–1498 (1952).

Losana, L., "Acido Ferrico e Ferrati (I)," Gazz. Chim. Ital., vol. 55., pp. 468–497 (1925) (No Translation).

Murman, R.K., and H.J. Goff, "Studies on the Mechanism of Isotopic Oxygen Exchange and Reductio of ferrate (VI) Ion, $FeO_4^{2-}$)$^1$, "J. Am. Chem. Soc., vol. 93., 6058–6065 (1971).

Thompson, G., W. Ockerman, L.T. and J.M. Schreyer, "Preparation and Purification of Potassium Ferrate,"J. Am. Chem. Soc., vol. 73., pp. 1379–1381 (1951).

Waite, Thomas, Marsha Gilbert and Curtis Hale, "Analytical Notes—An Investigation of the Applicability of Ferrate Ion of Disinfection," Journal American Water Works Association, vol. 68 No. 9 pp. 495–497 (Sep. 1976).

Walte, T. and Joan Fagan "Biofouling Control with Ferrate," Environ. Sci. Technol., vol. 17., 123–125 (1983).

Williams, D., and J. Riley, "Preparation and Alcohol Oxidation Studies of the Ferrate (VI) Ion, $FeO_4^{2-}$,"Inorg. Chim. Acta, vol. 8., pp. 177–183 (1974).

Wood, R.H., "The Heat, Free Energy and Entropy of the Ferrate (VI) Ion, " J. Am. Chem. Soc., vol. 80., pp. 2038–2041 (1957).

Deininger, J. Paul, Linda K. Chatfield and Duane R. Churchwell, "Developments in Transsuranic Element Polishing from Radioactive Wastewaters Using Ferrate ($FEO_4$–2) Chemical Technology", Symposium on Waste Management (1990 Tucson, AZ) vol. 1, pp. 789–795 (1990).

Kazama, Futaba, "Respiratory Inhibition of Sphaerotilus by Potassium Ferrate", Journal of Fermenation and Bioengineering, vol. 67, No. 6, pp. 369–373 (1989).

Kazama, Futaba and Kenju Kato, "Removal of Heavy Metal Ions and Fumic Acid by Coagulation with Potassium Ferrate (VI)," Tåokyåo: Nihon Kåogyåo Yåosui Kyåokai, vol. 357, pp. 8–13 (1988), (no translation).

*Primary Examiner*—David Brunsman
*Attorney, Agent, or Firm*—Jeffery D. Myers; Deborah A. Peacock

[57] ABSTRACT

A method of producing ferrate is disclosed, in which $Fe^{3+}$ is oxidized with monoperoxosulfate ($HSO_5^-$) to form $K_2FeO_4$/$K_2SO_4$. The isolation of the potassium ferrate ($K_2FeO_4$) product in a sulfate matrix ($K_2SO_4$) stabilizes the ferrate against decomposition and inhibits clumping of the solid product by inhibiting moisture adsorption. The method is a safe, simple process for the production of ferrate that is reliable, fast, and inexpensive, and that avoids the use of chlorine or chlorinated products, thus avoiding their harmful side effects. The improved ferrate product of this method is particularly useful for water and wastewater treatment, especially in the treatment of sulfides and hydrazines, and in other applications.

62 Claims, No Drawings

METHOD FOR SYNTHESIZING FERRATE AND FERRATE PRODUCED THEREBY

BACKGROUND OF THE INVENTION

1. Field of the Invention

The present invention relates to a new method for producing the ferrate ion, and, more particularly, to a method for the production of ferrate that circumvents the requirement for hypochlorite inherent in the present methodology for producing ferrate. The ferrate produced according to this method is isolated in a new matrix that imparts desirable physical and chemical properties.

2. Background Art

The ferrate ion, $FeO_4^{2-}$, is known to be a tetrahedral ion that is isostructural with chromate or permanganate. The ferrate ion has been shown to exist in aqueous media as the tetrahedral species $FeO_4^{2-}$. Redox potentials for this ion have been estimated in both acidic and basic media (R. H. Wood, *J. Am. Chem. Soc.*, Vol. 80, p. 2038–2041 (1957)):

$$3e^- + 8H^+ + FeO_4^{2-} \rightarrow Fe^{3+} + 4H_2O \quad E° = 2.20V$$

$$3e^- + 4H_2O + FeO_4^{2-} \rightarrow Fe^{3+} + 8OH^- \quad E° = 0.72V.$$

Ferrate is further known to be a strong oxidant that can react with a variety of inorganic or organic reducing agents and substrates (R. L. Bartzatt, J. Carr, *Trans. Met. Chem.*, Vol. 11 (11), pp. 414–416 (1986); T. J. Audette, J. Quail, and P. Smith, *J. Tetr. Lett.*, Vol. 2, pp. 279–282 (1971); D. Darling, V. Kumari, and J. BeMiller, *J. Tetr. Lett.*, Vol. 40, p. 4143 (1972); and R. K. Murmann and H. J. Goff, *J. Am. Chem Soc.*, Vol. 93, p. 6058–6065 (1971)). It can act as an important and selective oxidant for synthetic organic studies and is capable of oxidizing/removing a variety of organic compounds from, and of destroying many contaminants in, aqueous media.

In the absence of a suitable reductant, ferrate will react with water to form ferric ion and molecular oxygen (J. Gump, W. Wagner, and E. Hart, *Anal. Chem.*, Vol. 24., p.1497–1498 (1952)):

$$FeO_4^{2-} + H_2O \rightarrow Fe^{3+} + O_2.$$

This reaction is of particular interest to water treatment since it provides a suitable mechanism for self-removal of ferrate from solution. In all oxidation reactions, the final iron product is the ferric ion which forms hydroxide oligomers. Eventually flocculation and settling occur which remove suspended particulate matter.

There is an existing need for replacement of currently used laboratory oxidants, especially the chromate derivatives. Chromate and chlorine are of environmental concern, and in chromate oxidations, Cr(III) is formed, which is a suspected carcinogen. Also, in permanganate reactions, $MnO_2$ is generated.

There is a need for development of new, safe, inexpensive and "environmentally friendly" oxidants, especially for water treatment applications. The treatment of industrial and municipal effluents containing hazardous organic compounds is an important research endeavor. Currently, several methods for contaminant removal exist, including adsorption, coagulation, biodegradation, chemical degradation, and photodegradation. Chemical degradation is often the most economically feasible as well as the easiest method for water treatment and usually involves chlorine, hypochlorite, or ozone. Although effective, these oxidants often have deleterious side effects. Chlorine and ozone are poisonous and highly corrosive gases.

Hypochlorite is generally supplied as a solid or in aqueous solution; however, it is generated using chlorine gas and can rapidly decompose back into chlorine upon heating or chemical mishandling. Also, although hypochlorite, $OCl^-$, is used as a chlorine source for water treatment at smaller operations, it is expensive.

Additionally, the handling of chlorine, or hypochlorite, poses potential danger to workers due to its high toxicity. A major disadvantage of chlorine and chlorine-containing oxidants is that excess chlorine can produce chlorinated oxidation products (e.g., chloramines, chlorinated aromatics, chlorinated amines or hydrocarbons), many of which are potential mutagens or carcinogens, and may be more toxic than the parent contaminants and/or more difficult to remove. Because these compounds potentially constitute a health hazard for the public, a move away from chlorine use is needed.

Also, there is a vital need for new methods for $H_2S$ control in municipal sanitary sewer systems and treatment plants, and industrial waste treatment facilities. One of the ongoing major problems in waste water treatment is severe corrosion of facility structures from contact with hydrogen sulfide gas, $H_2S$, or its oxidation products after contact with air. Equally important are the health risks from exposure to $H_2S$ gas for even short periods of time; such exposure is reported to be the leading cause of death among sanitary sewer workers.

Ferrate is known to be useful in a variety of waste water treatment applications. Ferrate oxidations, and their application to waste water treatment, have been studied with a view toward using ferrates in several industrial applications, in particular with a number of organic substrates. (J. D. Carr, P. B. Kelter, A. Tabatabai, D. Spichal, J. Erickson, and C. W. McLaughlin, *Proceedings of the Conference on Water Chlorination and Chemical Environmental Impact Health Effects*, pp. 1285–88 (1985)). The applicability of ferrate in waste treatment involves not only its oxidative abilities, but also its floc formation, disinfective properties, and generally remediative faculties.

Since ferrate is an efficient disinfectant, it has potential for use in lieu of extensive chlorination of drinking water. As pollution increases, the need exists for a water purifying agent that can be safely used by the individual on "small" quantities of drinking water as well as at the municipal/industrial wastewater level. Such purification agents should ideally be able to disinfect and remove suspended particulate materials, heavy metals (including radioisotopes) and some organics through flocculation, in order to at least partially destroy dissolved organic contaminants through oxidation, and as a final step, to remove itself from solution. A one-step purification reagent which meets these criteria is $K_2FeO_4$, potassium ferrate. This compound should be able to successfully compete with the current two-step, chlorination/ferric sulfate, flocculation technique, thereby circumventing the production of toxic or carcinogenic halogenated organics.

Ferrate oxidative destruction of nitrosamines, which are potent carcinogens, in waste water has been reported (D. Williams and J. Riley, *Inorg. Chim. Acta*, Vol. 8, p. 177 (1974)).

Relatively low ferrate doses have been found to profoundly reduce the BOD and TOC in domestic secondary effluents (F. Kazama and K. Kato, *Kogabkubu Kenkyu Kokou*, Vol. 35, pp. 117–22 (1984)).

Ferrate has been employed in Japan for the treatment of mill effluent and sewage sludge from municipal sources.

Treatment at 125–1000 mg $K_2FeO_4$/L dose levels was found to significantly decrease the $COD_{Mn}$, due to partial oxidation of the high molecular weight organics. Decreases in the UV spectrum after treatment with ferrate have been interpreted as removal of fulvic and humic acids within the iron(III) coagulate produced when the ferrate was reduced (F. Kazama and K. Kato, *Kogabkubu Kenkyu Kokou*, Vol. 34, pp. 100–4 (1984)).

The biocidal properties of ferrate have been investigated (Y. Yamamoto, *Mizu Shori Gijutsu*, Vol. 24, p. 929 (1983)). An important property of ferrate toward its application as a water treatment agent is its ability to act as a potent biocide. Ferrate has been used in Kofu, Japan for disinfection in river water treatment, as well as in municipal sewage treatment processes; with its use, maximal removal of coliform bacteria in the pH range of 6 to 8 was obtained. It has been shown to be effective against *e. coli* and *sphaerotilus* (F. Kazama, *J. Ferment. Bioeng.*, Vol. 67, p.369 (1989)). In Kofu City, Japan, ferrate has been used to remove coliform bacteria from treated sewage and river water (F. Kazama and K. Kato, *Hamanashi Daigaku Kogakubu Kenkyu Hokoku*, Vol 35, p.117 (1984)).

Removal of heavy metals, such as Cu, Cd, and Mn using ferrate is also known. Ferrate has been shown to remove colloidal suspensions and heavy metals through flocculation and bacteria via its disinfecting properties (T. Suzuki, *Odaku Kenkyu*, Vol.11 (5), p. 293–296 (1988)). The mechanism for Mn removal probably involves the oxidative formation of insoluble $MnO_2$ and subsequent entrapment of these metals into the $Fe(OH)_3$ precipitate resulting from ferrate's reduction product. Cu and Cd are removed in a similar manner. The removal of heavy metal ions and humic acid by coagulation after treatment with potassium ferrate has been studied. Metal ions are generally trapped during sedimentation (F. Kazama and K. Kato, *Kogyo Yosui*, Vol. 357, p. 8–13 (Chemical Abstract 110:63421y) (1988)).

Direct filtration of ground water using ferrate has been examined at the pilot plant level (T. Waite, *Environ. Sci. Technol.*, Vol. 17, p.123 (1983)). Biofouling control is also under investigation (R. L. Bartzatt and D. Nagel, *Arch. Env. Health*, 1991, Vol. 46(5), pp. 313–14 (1991)). The coagulative properties of ferrate have been found to be useful for turbidity removal in fresh water. Studies have shown that when model condensers were dosed with $10^{-5}$M solutions of ferrate twice a day, for 5 minutes, biofilm growth was inhibited (T. Waite, M. Gilbert, and C. Hare, *Water Tech/Qual.*, pp. 495–497 (1976)).

Ferrate has also been proposed as a treatment agent for the removal of radionuclides (transuranics) from waste water. To date, the focus has been on the nuclear industry, where ferrate is used to remove uranium and transuranic elements from contaminated water. In addition, there is currently an interest in using ferrate in the removal of plutonium and americium from waste water effluent.

U.S. Pat. No. 4,983,306 to Deininger discloses a method for transuranic element polishing from radioactive wastewater using $FeO_4^{2-}$ that involves adjusting the pH of a transuranic element—containing water source to a range of 6.5–14.0. Supposedly, removal occurs by co-precipitation of the transuranics within the ferric hydroxide matrix similar to other heavy metals. Also, small amounts of chemical are used compared to common technology. Based on chemical dosages, radioactive sludge generation using this method is reduced by 3–20, depending on suspended solids content in the wastewater feed. (J. P. Deininger, L. K. Chatfield, and D. R. Churchwell, *Waste Manage.* '90, Vol. 1, pp. 789–795 (1990)).

In summary, the use of ferrate, $FeO_4^{2-}$, promises a safe, convenient, versatile and cost effective alternative to current approaches for water and wastewater treatment. Ferrate is an environmentally friendly oxidant that represents an ideal substitute for other oxidants, particularly chromate and chlorine, which are of environmental concern. Ferrate has the benefit of being "environmentally safe" as the iron product is simply ferric oxide, i.e., rust. Although the oxidation reactions with ferrate appear similar to those known for $MnO_4^-$ and $CrO_4^{2-}$, ferrate exhibits greater functional group selectivity in its oxidations and generally reacts to produce a cleaner reaction product.

Ferrate is also a safe and easily handled solid, ideal for wastewater remediation at both large and small scale levels. In addition, the potential exists for application of ferrate to a host of other waste water contaminants. As a result, ferrate oxidation reactions may have significant application in industrial syntheses.

A major problem hindering ferrate implementation is its difficulty of preparation, which translates into increased production costs. If the commercial application of ferrate is to be realized, there is a need for new synthetic preparative procedures that are easier and less expensive in order to provide ferrate material at economically competitive prices. Moreover, in addition to cost, the current methods known for producing a commercially useful ferrate product, and the results of these methods, have been less than satisfactory.

Various methods for producing ferrate are known and used. Stahl reportedly made iron(VI) compounds, ferrates in 1702. In Stahl's early work, a purple solution resulted from aqueous dissolution of the products formed during fusion of iron filings and solid potassium nitrate with a flame (C. A. Rosell, *J. Ann. Chim. Soc.*, pp. 760–69 (1895)). In 1841, Fremy demonstrated that the leaching of $K_2FeO_4$ from the solid melt causes this purple color (E. F. Fremy, *Ann. Chim. Phys.*, pp. 361–82 (1844)). In 1925, Losana described the preparation of a variety of ferrate salts that included $Ba^{2+}$, $Ag^+$, $Sr^{2+}$, $Ca^{2+}$, $Pb^{2+}$, $Ni^{2+}$, $Co^{2+}$, and $Cu^{2+}$ by direct precipitation from aqueous sodium/potassium ferrate solution with salts of the desired counter ion, as well as the preparation of impure salts of $Th^{4+}$, $Fe^{2+}$, $Fe^{3+}$, and $Al^{3+}$ (L. Losana, *Gazz. Chim. Ital.*, Vol. 55, pp. 468–97 (1925)). In a similar study, Gump described the preparation of group 1A metal salts ($Li^+$–$Cs^+$) and $La^{3+}$ ferrates (J. Gump., E. Hart, W. Wagner, *Analyt. Chem.*, Vol. 24, pp. 1497–1498 (1952)).

Three approaches for ferrate synthesis currently exist: electrolysis, oxidation of $Fe_2O_3$ in an alkaline melt, or oxidation of Fe(III) in a concentrated alkaline solution with a strong oxidant.

In the laboratory, by means of hypochlorite oxidation of iron (Fe(III)) in strongly alkaline (NaOH) solution, the ferrate product has been precipitated by the addition of saturated KOH (G. Thompson, L. Ockerman, and J. Schreyer, *J. Am. Chem. Soc.*, Vol. 73, pp. 1379–81 (1951)):

$$10OH^- + 3OCl^- + 2Fe^{3+} \rightarrow 2K_2FeO_4 + 3Cl^- + 5H_2O.$$

The resulting purple solid is stable indefinitely when kept dry.

Commercial production of ferrate typically uses a synthetic scheme similar to the laboratory preparation, also involving a hypochlorite reaction. Most commonly, using alkaline oxidation of Fe(III), potassium ferrate ($K_2FeO_4$) is prepared via gaseous chlorine oxidation in caustic soda of ferric hydroxide, involving a hypochlorite intermediate.

$$Cl_2 + Fe(OH)_3 \xrightarrow{KOH/NaOH} K_2FeO_4 + Cl$$

Currently, Analytical Development Corporation of Colorado Springs, Colo., manufactures and distributes ferrate for water purification and for waste water treatment under the name TRUCLEAR™, using the hypochlorite synthesis described above.

A number of difficulties are associated with the production of ferrate using the method described above. First, several requirements for reagent purity must be ensured for maximized ferrate yield and purity. However, even with these requirements satisfied, the purity of the potassium ferrate product still varies widely and depends upon many factors, such as reaction time, temperature, purity of reagents, and isolation process. Ferrate prepared this way is typically 20% pure, with the major contaminants being alkali metal hydroxides and chlorides and ferric oxide. However, samples of this degree of purity are unstable and readily decompose completely into ferric oxides.

Other than the problems with product impurities and instability, there are also mechanical problems associated with the isolation of the solid ferrate product, such as filtering cold lye solutions having a syrupy consistency.

Finally, the most overwhelming disadvantage to this process is the use of hypochlorite. Although the ferrate ion, $FeO_4^{2-}$ is an environmentally friendly oxidant itself, if the ferrate is produced by reaction with hypochlorite, its use will incur the deleterious side effects attributable to chlorine gas products.

Other processes for preparation of ferrates are known and used, many of them also involving the reactions with hypochlorite. U.S. Pat. No. 5,202,108 to Deininger discloses a process for making stable, high-purity ferrate (VI) using beta-ferric oxide (beta-$Fe_2O_3$) and preferably monohydrated beta-ferric oxide (beta-$Fe_2O_3$—$H_2O$), where the unused product stream can be recycled to the ferrate reactor for production of additional ferrate.

U.S. Pat. Nos. 4,385,045 and 4,551,326 to Thompson disclose a method for direct preparation of iron an alkali metal or alkaline earth metal ferrates from inexpensive, readily available starting materials, where the iron in the product has a valence of +4 or +6. The method involves reacting iron oxide with an alkali metal oxide or peroxide in an oxygen free atmosphere or by reacting elemental iron with an alkali metal peroxide in an oxygen free atmosphere.

U.S. Pat. No. 4,405,573 to Deininger et al. discloses a process for making potassium ferrate ($K_2FeO_4$) in large-scale quantities (designed to be a commercial process) by reacting potassium hydroxide, chlorine, and a ferric salt in the presence of a ferrate stabilizing compound.

U.S. Pat. No. 4,500,499 to Kaczur et al. discloses a method for obtaining a highly purified alkali metal or alkaline earth metal ferrate salts from a crude ferrate reaction mixture, using both batch and continuous modes of operation.

U.S. Pat. No. 4,304,760 to Mein et al. discloses a method for selectively removing potassium hydroxide from crystallized potassium ferrate by washing it with an aqueous solution of a potassium salt (preferably a phosphate salt to promote the stability of the ferrate in the solid phase as well as in aqueous solution) and an inorganic acid at an alkaline pH.

U.S. Pat. No. 2,758,090 to Mills et al. discloses a method of making ferrate, involving a reaction with hypochlorite, as well as a method of stabilizing the ferrate product so that it can be used as an oxidizing agent.

U.S. Pat. No. 2,835,553 to Harrison et al. discloses a method, using a heating step, where novel alkali metal ferrates with a valence of +4 are prepared by reacting the ferrate (III) of an alkali metal with the oxide (or peroxide) of the same, or a different, alkali metal to yield the corresponding ferrate (IV).

U.S. Pat. No. 5,284,642 to Evrard et al. discloses the preparation of alkali or alkaline earth metal ferrates that are stable and industrially usable as oxidizers, and the use of these ferrates for water treatment by oxidation. Sulfate stabilization is also disclosed.

The development of an economical source of ferrate is necessary in order to derive the benefits associated with ferrate application in a wide range of water treatment processes. In view of the difficulties associated with the previously known methods for preparing ferrates and the problems inherent in the ferrate produced by these known methods, there is therefore an existing need for a new preparative method for ferrate that is easy, convenient, safe and inexpensive, and that avoids both the chemical and mechanical problems and the harmful side effects of the commonly used hypochlorite process for ferrate production.

SUMMARY OF THE INVENTION

It is an object of the invention to provide a new, convenient, inexpensive, and safe method for producing a new, purer, and more stable potassium ferrate ($K_2FeO_4$) compound, which avoids the harmful use of hypochlorite ($OCl^-$) oxidation. Current methods result in approximately 45% purity, while the method of the invention results in a ferrate product that is 55% to 80% pure.

It is an object of the invention to provide an environmentally friendly oxidant for water remediation, involving a variety of wastewater contaminants and water treatment problems, that produces a cleaner reaction product and thereby to replace existing laboratory and industrial oxidants which often have deleterious side effects.

It is a further object of the invention to provide a new, safe, and inexpensive industrial oxidant that overcomes the problems associated with known oxidants for water treatment (e.g. chlorine, hypochlorite, ozone) and with the by-products of these oxidants.

It is another object of this invention to provide a new ferrate product to be used in the control of hydrogen sulfide gas in sewer systems, treatment plants, and waste treatment facilities.

It is a still further object of the invention to provide an improved potassium ferrate product for remediation of uranium, transuranics, and rocket fuel propellant contaminants (hydrazine and monomethylhydrazines) in water.

These and other objects are attained in a process for preparing ferrate ($FeO_4^{2-}$) comprising the step of oxidizing $Fe^{3+}$ with monoperoxosulfate ($HSO_5^-$). More specifically, the present invention is further directed to a process for preparing ferrate ($FeO_4^{2-}$) comprising the steps of:

(a) mixing ferric sulfate and a potassium salt;

(b) suspending the ferric sulfate and potassium salt mixture in an ice bath;

(c) adding ice and potassium hydroxide to the mixture with vigorous stirring, wherein the mixture changes color during stirring;

(d) monitoring the color change produced by the stirring;

(e) filtering the mixture immediately after completion of the color change;

(f) adding a first amount of potassium hydroxide to the filtrate obtained from the filtering step;

(g) chilling the mixture of potassium hydroxide and filtrate;

(h) adding a second amount of potassium hydroxide to the chilled potassium hydroxide and filtrate mixture;

(i) continuing the chilling of the potassium hydroxide and filtrate mixture;

(j) filtering the potassium hydroxide and filtrate mixture to obtain a solid precipitate;

(k) leaching the solid precipitate with potassium hydroxide;

(l) filtering off the leachate to obtain a solid ferrate product; and (m) drying the solid ferrate.

In one embodiment of the invention, the oxidizing step is performed in the presence of a base. In other embodiments of the invention, the base may be potassium hydroxide (KOH) or alternatively sodium hydroxide (NaOH).

In still another embodiment of the invention ferric nitrate ($Fe(NO^3)_3$) is oxidized with the monoperoxosulfate ($HSO_5^-$). Alternatively, ferric sulfate ($Fe_2(SO_4)_3$) is oxidized with monoperoxosulfate ($HSO_5^-$).

The method of the invention further comprises the step of isolating the ferrate ($FeO_4^{2-}$) produced, and still further comprises performing the isolating step by pressurized filtration.

According to another embodiment of the invention, the ferrate ($FeO_4^{2-}$) produced by the new method is potassium ferrate ($K_2FeO_4$). In yet another embodiment of the invention, the potassium ferrate ($K_2FeO_4$) produced is isolated in a sulfate matrix ($K_2SO_4$). More particularly, the invention includes the improved $K_2FeO_4/K_2SO_4$ product of the new method of producing ferrate.

The limitations associated with existing methods for preparing the ferrate ion are overcome by the present invention which provides an alternative method for making an improved ferrate and which advantageously avoids the use of hypochlorite in the reaction.

The ferrate ($FeO_4^{2-}$) produced according to the method of the invention may be used to treat contaminants in water. According to the invention, these contaminants may comprise at least one member selected from the group consisting of chemical compounds, toxic substances, minerals, and compounds thereof. Alternatively, these contaminants may comprise at least one member from the group consisting of hydrocarbons, solvents, metals and salts. More particularly, these contaminants are hydrazines or, alternatively, sulfides.

The ferrate produced by the method of the invention is an environmentally friendly reagent for the production of a variety of industrial chemicals and for the remediation of hazardous wastes. The advantages of this method for the production of ferrate are three-fold.

First, this method for production of ferrate involves a safer, simpler, substantially less expensive, and faster process for the production of ferrate than the previously known production methods, in particular the only currently available commercial method, i.e. the "hypochlorite method". The method of the invention requires fewer and simpler steps which can be performed in 30 minutes to one hour compared to 4 to 5 hours required for performance of the known ferrate production methods. Because of the convenience, economy, and ease of preparation of the method, and the increased purity and greater stability of the product, the new process for producing ferrate provided by the subject invention affords an economical source of ferrate for water treatment.

Second, the isolation of the potassium ferrate ($K_2FeO_4$) in the sulfate matrix ($K_2SO_4$) stabilizes the product against decomposition and prevents clumping of the initially free-flowing solid product by inhibiting moisture adsorption. In providing for greater product stability, the stabilized matrix of the invention therefore provides greater marketability.

Third, and perhaps the most important in view of the difficulties associated with the use of hypochlorite in the usual ferrate-producing reactions, and especially in view of recent EPA restrictions against the use of chlorine, this method for producing ferrate circumvents the use of chlorine or chlorinated products.

Further, the stabilized potassium ferrate produced by the inventive method is capable of replacing chlorine in certain applications and may be used both to clean hydrogen sulfide from water sources and to completely oxidize rocket fuels such as hydrazine to innocuous substances.

Additional objects, advantages and novel features, and further scope of applicability of the present invention will be set forth in part in the detailed description to follow, taken in conjunction with the accompanying Figures, and in part will become apparent to those skilled in the art upon examination of the following detailed description, or may be learned by practice of the invention. The objects and advantages of the invention may be realized and attained by means of the instrumentalities and combinations particularly pointed out in the appended claims.

DETAILED DESCRIPTION OF THE INVENTION

The new method for the production of ferrate ion involves the monoperoxosulfate oxidation of $Fe^{3+}$ to $FeO_4^{2-}$. More specifically, it involves the oxidation of ferric sulfate with monoperoxosulfate ($HSO_5^-$), commercially sold by DuPont in large-scale quantities under the trade name OXONE™, a triple salt containing $K_2SO_4$, $KHSO_4$, and $KHSO_5$. The oxidation is performed in the presence of a base, e.g. preferably potassium hydroxide (KOH) although sodium hydroxide (NaOH) de may also be used. The general equation for the ferrate production method of the subject invention is the following:

This new method includes the intermediate step of oxidizing $Fe^{3+}$ with monoperoxosulfate, $HSO_5^-$ to form the ion, which is subsequently precipitated as $K_2FeO_4$, as follows:

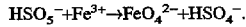

In the preferred embodiment, the inventive procedure simply requires mixing solid ferric sulfate and OXONE™ together in appropriate amounts, and adding ice and 6M $KOH_{(aq)}$:

Alternatively, this new method includes the direct oxidation of ferric sulfate, $Fe_2(SO_4)_3$, by monoperoxysulfate, $HSO_5^-$:

This invention provides a new, cheap, safe and easy route for the synthesis of potassium ferrate. Advantageously, the inventive method circumvents the use of gaseous chlorine to produce ferrate free of chloride contaminants. In addition, because generation of a hypochlorite oxidant is eliminated, less potassium hydroxide is necessary, thereby decreasing solution viscosities. This permits easier and faster filtration during the isolation of solid $K_2FeO_4$. The use of OXONE™ also circumvents filtration problems associated with hypochlorite solutions (this method uses saturated potassium hydroxide solutions having the consistency of honey). The entire process can be performed within one hour.

In contrast to the method of the invention, the most commonly used alkaline oxidation method of preparing potassium ferrate ($K_2FeO_4$) requires the use of hypochlorite oxidation of iron (Fe(III)) in strongly alkaline (NaOH) solution, wherein the $K_2FeO_4$ is precipitated by the addition of saturated KOH. One of the main reasons that ferrate has not been used to any great extent as an oxidant, and why it has not been studied in much detail, is the difficulty and danger of preparation using this method.

First, the hypochlorite used for ferrate synthesis must be made by the disproportionation of chlorine in a cold caustic soda solution: $Cl_2+OH^-\rightarrow Cl^-+OCl^-+H^+$, followed by filtration of the resulting precipitate of NaCl.

This method then requires the use of gaseous chlorine, large amounts of caustic soda and potassium hydroxide to produce the desired ferrate, as well as a multiplicity of strictly controlled steps and conditions. Finely divided ferric nitrate is added to the hypochlorite solution described above. The step of grinding the iron reactant is necessary to promote complete dissolution of the ferric ion into the alkaline solution.

Also, reagent purity must be ensured for maximized ferrate yield and purity, e.g.: to minimize catalytic decomposition of ferrate during the synthetic procedure, membrane cell-grade aqueous KOH must be used; the chlorine gas used in the synthesis must be "substantially pure" chlorine gas produced by membrane-type chlor/alkali cells, or the chlorine may be scrubbed immediately before use; and the source of the ferric salt used must be controlled.

The basic reaction is the following:

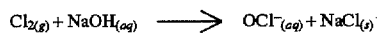

A continuous synthesis process is required. Synthesis of ferrate begins by addition of KOH solutions to a cold-water jacketed reactor set between 20° and 40° C. Atmospheric pressure is maintained in the reactor. A cooling step for the original solution is required during the reaction process, to slow the ferrate oxidation of the solvent and to create ferric hydroxide sludge. For the reaction to occur, it is critical to maintain room temperature but not to allow the temperature to become too high, which causes ferrate decomposition in solution. After the reaction is complete and the precipitate has been isolated, the ferrate precipitate must be washed with ethanol, and then dried in a vacuum overnight.

Mole ratios of reactants are typically restricted to a certain range: ($Cl_2$, KOH, Fe(III)) are (1.5–30: :10–60:: 1). The time factor is critical: The average residence time of the ferrate in the reactor is 180 minutes; and residence times greater than 300 minutes lead to significant ferrate decomposition. The crude solid product is typically separated by centrifugation within 5 minutes of finishing the KOH addition. Compared to the subject invention, the total time for synthesis using the hypochlorite method, once the procedure has become "routine", is 4–5 hours.

Using the hypochlorite oxidation method, the purity of the potassium ferrate product varies widely and depends upon many factors, such as reaction time, temperature, purity of reagents, and isolation process. In the products of hypochlorite oxidations, the final ferrate is typically contaminated with NaCl, KCl, KOH and $Fe(OH)_3$. Ferric oxides and potassium hydroxide catalyze the decomposition of ferrate upon exposure to moisture. Therefore, selectively dissolving the potassium ferrate into 10–20% $KOH_{(aq)}$ (by weight) at 20°–50°C. is necessary to purify the product. However, the KCl and $Fe(OH)_3$ are insoluble in this media and must be removed by centrifugation. Typically, final purities of potassium ferrate range between 40–60% for large batch methods and >80% for small preparations upon recrystallization.

The method of the subject invention produces a ferrate of slightly higher initial purity than the ferrate produced using hypochlorite (33% with $OCl^-$ and >50% with OXONE™). Ferrate produced by the inventive method typically has about a 55%–80% purity. Additionally, purities up to 80% are routine with further purification. The major contaminant is potassium sulfate, which should not interfere with most ferrate studies or applications. No $KHSO_5$ appears in the final product, as it is decomposed while dissolved in base. Titrations also show no evidence for the presence of $HSO_5^-$ Moreover, in the monoperoxosulfate ($HSO_5^-$) oxidation method of the invention, the potassium ferrate ($K_2FeO_4$) product formed in the reaction, according to the preferred embodiment, is isolated in a potassium sulfate matrix ($K_2SO_4$), i.e. $K_2FeO_4/K_2SO_4$. An added benefit of the new ferrate product is that $K_2SO_4$, which can be co-precipitated during isolation, provides an isostructural matrix for the ferrate product, inhibits clumping of the initial solid product by inhibiting moisture adsorption, and stabilizes the ferrate product against decomposition in moist air, thereby enhancing its storage lifetime. This is in contrast to methods using hypochlorite oxidation, where ferrate is present in a chloride matrix and will decompose upon exposure to humid environments.

DESCRIPTION OF THE PREFERRED EMBODIMENT

During studies with monoperoxosulfate, i.e., studies of peroxide oxidations of sulfur compounds, the new, cheap, safe and easy method for the synthesis of ferrate, particularly potassium ferrate, was discovered.

Approximately 4.1 g of ferric sulfate and 20.1 g of OXONE™ are mixed as solids in a 300 mL beaker to produce a fairly homogeneous solid mixture. The beaker is suspended in an ice bath. To the solid mixture, 2 g of ice are added, as well as 50 mL of a 6M potassium hydroxide solution (previously chilled in ice bath), with vigorous stirring.

This solution develops a purple color within seconds and is immediately filtered through a coarse fritted glass filter funnel. Precipitation of solid potassium ferrate, suitable for kinetic studies, is accomplished by adding 50 mL of saturated room temperature KOH and chilling in ice for 10 minutes. After this time, another 5 mL of the saturated KOH is added. After complete precipitation, about 10 minutes, the solid is filtered through a medium fritted glass filter.

This solid is leached with 40 mL of 6M KOH into 50 mL of saturated room temperature KOH that has been chilled in an ice bath. When precipitation is finished, about 10 minutes, the solid potassium ferrate is filtered off through a sintered glass filter and dried with diethylether to prevent the ethanol from being oxidized by the ferrate if too much $H_2O$ is present. This is further dried under vacuum for about 1 hour. Yields of 0.5–1.0 g of the potassium ferrate salt are typical. The whole procedure can be performed within an hour.

The desired ferrate product has been produced in situ and isolated in the solid state. Ferrate exists in the solid state as a discrete tetrahedral species with essentially equivalent Fe—O bond lengths of 1.66 Å. It is isomorphous with other ions, such as chromate, manganate, and sulfate, which makes the production of mixed salts possible. Mixed sulfate/ferrate salts have been reported. Sulfate stabilizes ferrate against decomposition in the presence of atmospheric moisture. This stabilization has important application in producing the solid ferrate of the invention, which is in a matrix suitable for long-term storage.

The ferrate produced by the inventive method was analyzed spectrophotometrically using a Hewlett Packard Diode Array spectrophotometer. Tests of this product show it to have the identical chemical properties as the ferrate produced by the hypochlorite method, in that both procedures produce $K_2FeO_4$, although not in the same matrix.

Purities up to 80% are routine with further purification. Gravimetric analysis shows that the major contaminant is potassium sulfate, which should not interfere with most ferrate studies or applications. No $KHSO_5$ appears in the final product as it is decomposed while dissolved in base. Titrations also show no evidence for the presence of $HSO_{5-}$ since the purity obtained by iodometric titration agrees with spectrophotometric analyses.

To make the method commercially attractive, experiments were performed to optimize conditions for ferrate yield and purity, while minimizing costs. Studies were made of the effects of varying parameters such as temperature, pH, and OXONE™/iron starting concentrations.

In optimizing the synthesis of ferrate, various reactants were tested. It was determined that starting with ferric sulfate instead of ferric nitrate produces ferrate more easily and with less evolution of gas. Additionally, it was found that KOH is a superior source of base over sodium hydroxide.

Table 1 below shows the reactants used in 15 tests performed using the method of the invention, as well as the results produced during the testing.

TABLE 1

FERRATE TRIAL HISTORY

| Trial | #g oxone | #g ferric sulfate | amts of KOH/water | yield/observations |
|---|---|---|---|---|
| 1 | 3.3 | 0.29 | 20 ml of 6M/9.4 mL $H_2O$ | The first drops of base resulted in fizzing and then rust formation. |
| 2 | 3.2 | 0.3 | 20 mL sat'd KOH/10 mL $H_2O$ | Filtered out rust, but purple filtration was produced; added 20 mL of sat'd KOH and rust formed. |
| 3 | 3.3 | 1.3 | 10 mL 6M KOH/9.4 mL $H_2O$ | Solution went purple, then decomposed. |
| 4 | 3.0 | 0.8 | 10 mL 6M KOH/10 mL $H_2O$ | 1.7 g at 9.6% purity ferrate was produced. |
| 5 | 3.3 | 0.7 | 10 mL 6M KOH/7 mL $H_2O$ | 0.66 g at 8.1% purity was produced. |

TABLE 1-continued

FERRATE TRIAL HISTORY

| Trial | #g oxone | #g ferric sulfate | amts of KOH/water | yield/observations |
|---|---|---|---|---|
| 6 | 3.8 | 1.3 | 15 mL 6M KOH/20 mL $H_2O$ | Immediately formed rust. |
| 7 | 3.8 | 1.3 | 10 mL 6M KOH/16 mL $H_2O$ | Purple solution formed, then rust formed. |
| 8 | 3.8 | 1.4 | 10 mL 6M NaOH/16 mL $H_2O$ | Only rust formed. |
| 9 | 6.8 | 1.5 | 30 mL 6M KOH/15 mL $H_2O$ | Purple solution formed; no ferrate was isolated. |
| 10 | 6.8 | 1.5 | 11 mL 6M KOH/10 mL $H_2O$ | 0.15 g at 40% purity was produced. |
| 11 | 11.5 | 2.5 | 30 mL 6M KOH/14 mL $H_2O$ + 1 g of ice | 2.14 g at 69% purity was produced. |
| 12 | 25 | 2.1 | 50 mL 6M KOH/16 g ice | 2.5 g at 61% purity was produced. |
| 13 | 25 | 4.0 | 50 mL 6M KOH/5 g ice | 0.5 g at 85% purity was produced |
| 14 | 20 g | 4.0 | 50 mL 6M KOH/5 g ice | 1.0 g at 73% purity was produced. |
| 15 | 20.1 g | 4.1g | 50 mL 6M KOH/2 g ice | An additional 5 ml of sat'd KOH yielded 0.8 g at 80% purity. |

Although the invention has been described in detail with particular reference to these preferred embodiments, other embodiments can achieve the same results. Variations and modifications of the present invention will be obvious to those skilled in the art, and it is intended to cover in the appended claims all such modifications and equivalents. The entire disclosures of all references, applications, patents, and publications cited above, are hereby incorporated by reference.

What is claimed is:

1. A method of preparing ferrate ($FeO_4^{2-}$) comprising the step of oxidizing $Fe^{3+}$ with monoperoxosulfate ($HSO_5^-$).

2. The method of claim 1, wherein the oxidizing step is performed in the presence of a base.

3. The method of claim 2, wherein the base is potassium hydroxide (KOH).

4. The method of claim 2, wherein the base is sodium hydroxide (NaOH).

5. The method of claim 1, wherein ferric nitrate ($Fe(NO_3)_3$) is oxidized with monoperoxosulfate ($HSO_5^-$).

6. The method of claim 1, wherein ferric sulfate ($Fe_2(SO_4)_3$) is oxidized with monoperoxosulfate ($HSO_5^-$).

7. The method of claim 1, further comprising the step of isolating the ferrate ($FeO_4^{2-}$) produced.

8. The method of claim 7, wherein the isolating step is performed by pressurized filtration.

9. The method of claim 1, wherein the ferrate ($FeO_4^{2-}$) produced is potassium ferrate ($K_2FeO_4$).

10. The method of claim 9, wherein the potassium ferrate ($K_2FeO_4$) produced is isolated in a sulfate matrix ($K_2SO_4$).

11. The $K_2FeO_4/K_2SO_4$ product of the method of claim 10.

12. A method of preparing ferrate ($FeO_4^{2-}$) comprising the steps of:

(a) mixing ferric sulfate and a potassium salt;

(b) adding ice and potassium hydroxide.

13. The method of claim 12 wherein the ferric sulfate is mixed as a solid.

14. The method of claim 12 wherein the potassium salt is mixed as a solid.

15. The method of claim 12 wherein the ferric sulfate and the potassium salt are mixed as solids.

16. The method of claim 12 wherein the potassium salt is a triple salt.

17. The method of claim 16 wherein the triple salt comprises at least one member from the group consisting of $K_2SO_4$, $KHSO_4$, and $KHSO_5$.

18. The method of claim 16 wherein the triple salt is $K_2SO_4$, $KHSO_4$, and $KHSO_5$.

19. The method of claim 12, wherein the potassium hydroxide is in an aqueous solution.

20. The method of claim 19, wherein the aqueous solution is 6M potassium hydroxide.

21. The method of claim 12, wherein the adding step further comprises chilling the potassium hydroxide before adding it to the ferric sulfate and potassium salt mixture.

22. The method of claim 12, wherein the mixing step further comprises the step of suspending the ferric sulfate and potassium salt mixture in an ice bath.

23. The method of claim 22, wherein the step of suspending the ferric sulfate and potassium salt mixture in an ice bath is performed for a sufficient time to precipitate potassium ferrate.

24. The method of claim 12, further comprising the step of (c) vigorously stirring the ferric sulfate and potassium salt mixture to which the potassium hydroxide and ice have been added.

25. The method of claim 24, wherein the step of vigorously stirring the ferric sulfate and potassium salt mixture is performed for a sufficient time to substantially complete a color change in the mixture.

26. The method of claim 25, wherein the step of vigorously stirring the ferric sulfate and potassium salt mixture is performed in seconds.

27. The method of claim 24, wherein the mixture changes color during the step of vigorously stirring the ferric sulfate and potassium salt mixture, and the step of vigorously stirring further comprises the step of monitoring the color change produced during the stirring.

28. The method of claim 27, wherein the stirring step and the monitoring step are performed simultaneously.

29. The method of claim 27 further comprising the step of (d) filtering the mixture after completion of the color change.

30. The method of claim 29, wherein the step of filtering the mixture is performed immediately upon completion of the color change.

31. The method of claim 29, further comprising the steps of:
(e) adding a first amount of potassium hydroxide to the filtrate obtained from the filtering step; and
(f) chilling the mixture of potassium hydroxide and filtrate.

32. The method of claim 31, wherein the first amount of potassium hydroxide is 50 mL potassium hydroxide.

33. The method of claim 31, wherein the first amount of potassium hydroxide is saturated potassium hydroxide at room temperature.

34. The method of claim 31, wherein the step of chilling the potassium hydroxide and filtrate mixture is performed in ice.

35. The method of claim 31, wherein the step of chilling the potassium hydroxide and filtrate mixture is performed for a sufficient time to substantially precipitate solid potassium ferrate.

36. The method of claim 31, wherein the step of chilling the potassium hydroxide and filtrate mixture is performed for 10 minutes.

37. The method of claim 31, further comprising the step of (g) adding a second amount of potassium hydroxide to the chilled potassium hydroxide and filtrate mixture.

38. The method of claim 37, wherein the second amount of potassium hydroxide is 5 mL potassium hydroxide.

39. The method of claim 37, wherein the second amount of potassium hydroxide is saturated potassium hydroxide at room temperature.

40. The method of claim 37, further comprising the step of (h) continuing the chilling of the potassium hydroxide and filtrate mixture.

41. The method of claim 40, wherein chilling the potassium hydroxide and filtrate mixture is continued for a sufficient time to substantially complete precipitation of solid potassium ferrate.

42. The method of claim 40, wherein chilling the potassium hydroxide and filtrate mixture is continued for 10 minutes.

43. The method of claim 40, further comprising the step of:
(i) filtering the potassium hydroxide and filtrate mixture to obtain a solid precipitate.

44. The method of claim 43, further comprising the step of:
(j) leaching the solid precipitate with potassium hydroxide.

45. The method of claim 44, wherein the leaching step is performed with a 40 mL portion of potassium hydroxide into a 50 mL portion of potassium hydroxide.

46. The method of claim 45, wherein the 40 mL portion of potassium hydroxide is 6M potassium hydroxide.

47. The method of claim 45, wherein the 50 mL portion of potassium hydroxide is saturated, room temperature potassium hydroxide that has been chilled in an ice bath.

48. The method of claim 44, wherein the leaching step is performed for a sufficient time to substantially finalize complete precipitation of the solid precipitate.

49. The method of claim 44, wherein the leaching step is performed in 10 minutes.

50. The method of claim 44, further comprising the step of:
(k) filtering off the leachate to obtain a solid ferrate product.

51. The method of claim 50, further comprising the step of:
(1) drying the solid ferrate product.

52. The method of claim 51, wherein the drying step is performed chemically.

53. The method of claim 51, wherein the drying step is performed with diethylether.

54. The method of claim 51, wherein the drying step is performed under a vacuum.

55. The method of claim 51, wherein the drying step further comprises sequentially drying the solid ferrate chemically and then under vacuum.

56. The method of claim 51, wherein the steps comprising (a) through (1) are completed within one hour.

57. The method of claim 51, wherein the solid ferrate is 80% pure.

58. The method of claim 51, wherein the solid ferrate is potassium ferrate.

59. The method of claim 58, wherein the solid potassium ferrate is isolated in a sulfate matrix.

60. A method of preparing ferrate ($FeO_4^{2-}$) comprising the steps of:
(a) mixing ferric sulfate and a potassium salt;

(b) suspending the ferric sulfate and potassium salt mixture in an ice bath;

(c) adding ice and potassium hydroxide to the mixture with vigorous stirring, wherein the mixture changes color during stirring;

(d) monitoring the color change produced by the stirring;

(e) filtering the mixture immediately after completion of the color change;

(f) adding a first amount of potassium hydroxide to the filtrate obtained from the filtering step;

(g) chilling the mixture of potassium hydroxide and filtrate;

(h) adding a second amount of potassium hydroxide to the chilled potassium hydroxide and filtrate mixture;

(i) continuing the chilling of the potassium hydroxide and filtrate mixture;

(j) filtering the potassium hydroxide and filtrate mixture to obtain a solid precipitate;

(k) leaching the solid precipitate with potassium hydroxide;

(l) filtering off the leachate to obtain a solid ferrate product; and (m) drying the solid ferrate.

61. The method of claim 60, wherein the solid ferrate ($FeO_4^{2-}$) product is a potassium ferrate ($K_2FeO_4$) product.

62. The ferrate of claim 61, wherein the potassium ferrate ($K_2FeO_4$) product is isolated in a sulfate matrix ($K_2SO_4$).

* * * * *